Jan. 6, 1925.
J. R. GAMMETER
STEERING WHEEL
Filed Aug. 12, 1922
1,522,235
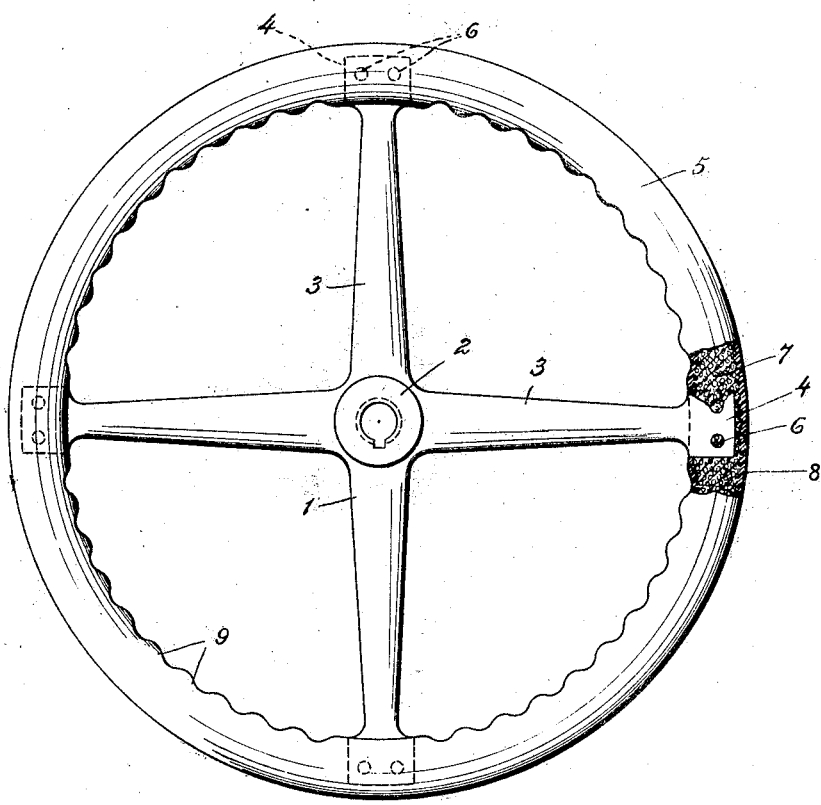
Inventor
John R. Gammeter.
By Robert M. Pierson
Atty.

Patented Jan. 6, 1925.

1,522,235

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

STEERING WHEEL.

Application filed August 12, 1922. Serial No. 581,316.

*To all whom it may concern:*

Be it known that I, JOHN R. GAMMETER, a citizen of the United States, residing at Akron, in the county of Summit and State of Ohio, have invented a certain new and useful Steering Wheel, of which the following is a specification.

This invention relates to hand-wheels such as steering wheels for automobiles, aircraft etc., of the type employing a molded rim, and its object is to provide an inexpensive, strong and light-weight article of this class having a rim provided with a durable outer surface and possessing other desirable qualities as more fully hereinafter explained.

The accompanying drawing shows a plan view of a steering wheel constructed according to my invention, with the rim partly in section.

1 is a metal spider having a hub 2 and arms or spokes 3 with widened, flat outer end portions 4 embedded in the rim 5 and perforated as at 6 for interlocking with the moldable material of said rim.

The rim 5 has an inner body or core 7 composed of cellular or "sponge" hard rubber, and an external shell or skin 8 of dense hard rubber completely surrounding and integrally vulcanized upon said core. Corrugations or roughening of any suitable type, as shown for example at 9, may be formed on the rim for improving the grip.

The cellular hard rubber is light, strong, and sufficiently rigid to make a highly satisfactory rim body. The rim as a whole is, at the same time, slightly elastic and capable of withstanding vigorous shocks and blows. The cellular core forms a strong and durable union with the metal spider and is not, like some other materials such as solid hard rubber, brittle and liable to crack where it joins the metal.

The cellular core 7 allows for expansion and contraction of the hard-rubber skin 8 under changes of temperature without cracking. As cellular rubber is a very poor heat-conductor the rim 5 will not absorb heat rapidly from the hands in cold weather, and the driver's comfort is thereby promoted.

The dense, hard rubber skin 8 is capable of taking a high polish and it may be compounded with one or more coloring pigments by which imitation mahogany or other desirable effects are produced. It is given a substantial thickness which, together with its physical qualities, provides a wearing surface of great durability.

In some cases where a higher coefficient of friction is desired I may make the skin 8 of soft or semi-soft vulcanized rubber by cutting down the amount of sulphur. The details of embodiment may also be varied in other particulars without departing from my invention.

I claim:

1. A hand-wheel including a molded rim having a hardened, cellular core and a dense, hardened skin of the same material as the core, integrally united therewith.

2. A hand-wheel including a rim having a cellular, hard-rubber core, and a dense, tough skin of plastic material molded thereon.

3. A hand-wheel including a rim having a cellular, hard-rubber core, and a dense skin of hardened plastic material formed thereon.

4. A hand-wheel including a rim having a cellular, hard-rubber core, and a rubber skin integrally vulcanized thereon.

5. A hand-wheel including a rim having a cellular, hard-rubber core, and a dense rubber skin integrally vulcanized thereon.

6. A hand-wheel including a rim having a core of cellular hard rubber, and a skin of dense hard rubber integrally vulcanized thereon.

7. A hand-wheel comprising a rim having a core of cellular hard rubber with a skin of dense rubber integrally vulcanized thereon, and a metal spider having the outer ends of its arms extended through said skin and embedded in said cellular core.

In witness whereof I have hereunto set my hand this 8 day of August, 1922.

JOHN R. GAMMETER.